United States Patent
Hillis et al.

(10) Patent No.: US 10,868,806 B2
(45) Date of Patent: Dec. 15, 2020

(54) SECURE COMMUNICATION NETWORK

(71) Applicant: Applied Invention, LLC, Burbank, CA (US)

(72) Inventors: W. Daniel Hillis, Rindge, NH (US); Mathias L. Kolehmainen, Louisville, KY (US)

(73) Assignee: APPLIED INVENTION, LLC, Burbank, CA (US)

( * ) Notice: Subject to any disclaimer, the term of this patent is extended or adjusted under 35 U.S.C. 154(b) by 179 days.

(21) Appl. No.: 16/019,423

(22) Filed: Jun. 26, 2018

(65) Prior Publication Data
US 2018/0375866 A1    Dec. 27, 2018

Related U.S. Application Data

(60) Provisional application No. 62/525,623, filed on Jun. 27, 2017, provisional application No. 62/539,220, filed on Jul. 31, 2017, provisional application No. 62/551,685, filed on Aug. 29, 2017.

(51) Int. Cl.
*H04L 29/06* (2006.01)
*H04L 9/32* (2006.01)

(52) U.S. Cl.
CPC .......... *H04L 63/083* (2013.01); *H04L 9/3268* (2013.01); *H04L 9/3271* (2013.01); *H04L 63/062* (2013.01); *H04L 63/0884* (2013.01); *H04L 63/10* (2013.01); *H04L 63/1441* (2013.01); *H04L 9/3234* (2013.01); *H04L 63/0861* (2013.01); *H04L 63/101* (2013.01)

(58) Field of Classification Search
CPC ............. H04L 63/0884; H04L 63/1441; H04L 63/062; H04L 9/3268; H04L 9/3234
USPC .......................................................... 726/4
See application file for complete search history.

(56) References Cited

U.S. PATENT DOCUMENTS

| | | | |
|---|---|---|---|
| 9,215,075 B1* | 12/2015 | Poltorak | H04L 9/006 |
| 2015/0086020 A1* | 3/2015 | Harjula | H04L 9/30 380/279 |
| 2015/0372875 A1* | 12/2015 | Turon | H04W 4/80 370/254 |
| 2016/0248682 A1* | 8/2016 | Lee | H04L 47/22 |
| 2016/0330220 A1 | 11/2016 | Dulkin et al. | |

\* cited by examiner

*Primary Examiner* — Evans Desrosiers
(74) *Attorney, Agent, or Firm* — Perkins Coie LLP; Michael A. Glenn

(57) ABSTRACT

Secure network communications are described. In one aspect, a secure network can include a passbuilder that provides policy information related to performance characteristics of the secure network. A sender can receive the policy information and transmit packets to a receiver if the policy information is complied with by the potential packet transmission.

17 Claims, 6 Drawing Sheets

SECURE COMMUNICATION NETWORK

RELATED APPLICATIONS

This application claims priority to U.S. provisional patent applications
- Ser. No. 62/525,623, filed 2017 Jun. 27, entitled "Alternet: A Secure Communication Network";
- Ser. No. 62/539,220, filed 2017 Jul. 31, entitled "Verinet: A Secure Communication Network"; and
- Ser. No. 62/551,685, filed 2017 Aug. 29, entitled "Verinet: A Secure Communication Network".

The entirety of each of these applications is incorporated herein by this reference thereto.

BACKGROUND OF THE INVENTION

Technical Field

The invention pertains to the field of communication and, in particular, secure communication networks.

Description of the Prior Art

Most existing network protocols were not originally designed with the expectation that malicious actors would have access to the network. For example, on the Internet, the general philosophy is to allow all connected users and devices to communicate. As explained in the Internet Engineering Task Force's 1996 Architectural Principles of the Internet, "confidentiality and authentication are the responsibility of end users and must be implemented in the protocols used by the end users". Because of this lack of authentication, it is often impossible to know who originated a message received via the Internet.

For this and other reasons, even using state-of-the-art best practices, protecting the online resources of an organization is extremely difficult to do perfectly. A single security weakness can cause catastrophic data losses, thefts, and shut down of critical functions. Denial of service attacks, insider attacks, and malware are especially difficult for organizations that support heterogonous software environments or multiple clouds and for organizations where users are a mix of employees, contractors, and vendors accessing the services from locations physically outside of company properties. Most organizations rely on properly-configured firewalls and VPNs to protect against outside attacks.

However, it is difficult to configure the firewalls in a way that enables legitimate communication outside the enclave without opening holes that can be exploited by attacks. And even if the firewall operates perfectly, the protected enclave remains vulnerable to attack from within—by an insider or by a rogue software entity such as a computer virus that penetrates the enclave, for example through an email attachment or USB drive. Most organizations accept that network security breaches are likely and use monitoring and auditing tools to catch them and stop them as quickly as possible when they inevitably occur.

These security practices and deficiencies are a consequence of design decisions in the Internet Protocol, which was defined so that anyone on the network could send a packet to anyone else with minimal coordination in managing the network. The network was not responsible for security. Except for specific devices like firewalls, the nodes in an IP network transmit packets without attention to who sent them and why.

BRIEF DESCRIPTION OF THE DRAWINGS

The foregoing aspects are better understood from the following detailed descriptions with reference to the drawings, in which.

DETAILED DESCRIPTION

Overview of Operation

Figure 1:
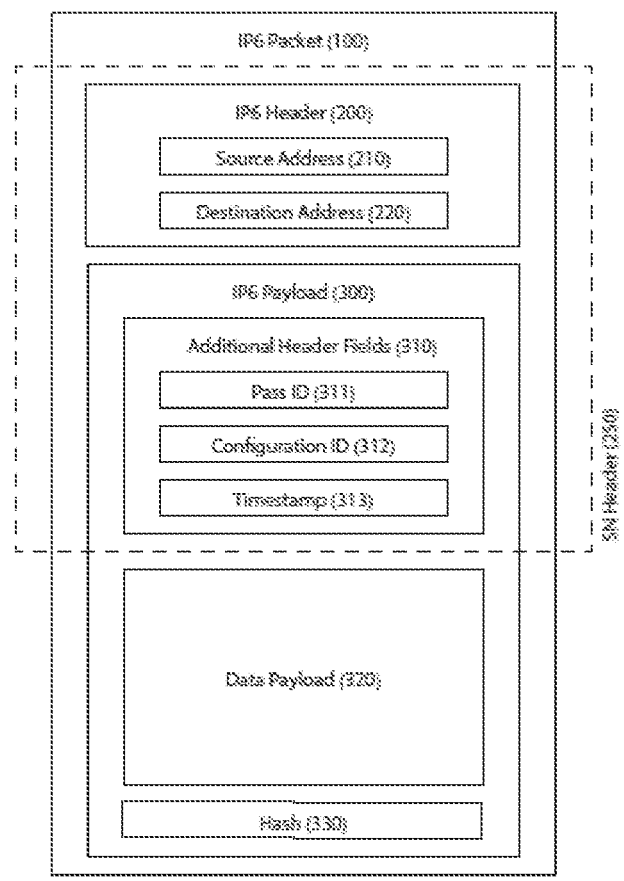
FIG. 1 shows a schematic representation of the structure of a SN packet according to a preferred embodiment.

Communications on the SN take place between authenticated communicators called credential-holders. Credential-holders may be accredited users, hardware devices, and software entities, or combinations thereof, for example a specific known employee communicating through a particular cell phone with approved software. Each credential-holder possesses credentials, such as biometric identifiers (e.g., measurable characteristics of the credential-holder, such as a fingerprint, facial features, DNA, etc.) or secret keys, that allow it to authenticate its identity to the network. Associated with each credential-holder are passes which grant the credential-holder permission to communicate with specific credential-holders within specific parameters defined for the pass, such as limits on bandwidth, time-period, and place of origin. Passes may also support guarantees on performance characteristics of the SN such as bandwidth, latency, and the means and robustness of transmission under the pass.

Each instance of the SN includes credential-holders at edge nodes that are communicatively connected by links and, optionally, intervening switching nodes. Each instance of the SN is under the control of a single entity called the netadmin. The netadmin specifies a set of security policies, and these policies are automatically enforced by a distributed software service on the network called the passbuilder. The passbuilder is responsible for implementing the polices, issuing all passes to credential-holders, and configuring the network to enforce the polices while supporting the permissions and guarantees of the passes. The passbuilder designates new network configurations and retires old network configurations in a controlled and tested manner that ensures reliability and does not interrupt the transmission of packets with valid permissions.

SN packets contain information specifying the pass and network configuration under which the packet was transmitted. SN switching nodes only forward packets that originate from authenticated credential-holders, specify an active configuration, and comply with the permissions of the specified passes.

A SN provides encryption and authentication both point-to-point across links and, optionally, end-to-end between credential-holders. SN links may be implemented over dedicated communication links or as virtual tunnels over the Internet. The passbuilder will issue passes with guarantees only if it can support those guarantees based on the links that are available to it.

In an embodiment, credential-holders include adapters that intercept all IP packets flowing to SN addresses, convert them to SN packet format and then send them toward their destination through a SN link Once they reach their destination they are converted by a receiving adapter into standard IP-packets and delivered.

A SN may serve as a distributed checkpoint in the Internet that allows only authorized and authenticated packets to pass. For example, a SN may be used to allow only authenticated and authorized transport-level communications between clients and a server. In such embodiments, the network address of an SN node is broadcast in the Internet's Domain Name System as a proxy for the server.

Overview of Benefits

For end users, a SN provides a way to communicate that is secure and reliable and guarantees that each message comes from an authenticated communicator. For network architects, a SN provides a convenient approach to providing a higher level of assurance for critical communications, both internal and external. It allows network architects to implement security and bandwidth allocation policies that are automatically enforced by the network itself. Consequently, a SN allows network architects to provide users with service guarantees, such as a minimum bandwidth or maximum latency, and a level of security and reliability that is impossible to achieve on the public Internet and difficult to achieve even in a privately managed network.

A SN also gives network architects more information about patterns of communication to monitor, diagnose, audit, and tune network usage. It limits the damage that can be done by insider attacks, rogue devices, or computer viruses, and it standardizes the vetting procedure for connected users, hardware devices and software entities. It makes it easier for network architects to protect network communications from identity spoofing, eavesdropping, interception, packet flooding, domain-name-system vulnerabilities, sniffing, data modification, worms, man-in-the-middle attacks, denial-of-service attacks, and many types of application-level attacks.

Network Structure and Administration

A SN includes a set of nodes, such as routers, switches, and network-connected devices, connected by links creating communication routes between the nodes. The SN may be a physical network or a virtual network overlaid atop an existing network.

Security policies on a SN are established by a network administrator, or netadmin, which is an individual or group that administers the network. The policies govern the vetting of communicators, the allowed patterns of communication, and the allocation of network resources. The netadmin administers the network via a functional unit called a passbuilder. There is a single passbuilder per network, which may be distributed across multiple hardware devices or software entities to provide increased capacity and/or redundancy. At least one node assists the passbuilder by allowing the passbuilder connection to the network to allow configuration of the network, though this connection need not be persistent. That is, this at least one node allows the passbuilder to be communicatively linked with other nodes of the network to perform its configuration of the network. The node providing the connection need not be exclusively dedicated to this role—it may also serve, for example, as a router or switch. Alternatively, the passbuilder may reside within one or more nodes.

The netadmin can authenticate to the passbuilder, which can authenticate itself to nodes on the network. The netadmin communicates the policies to the passbuilder, and the passbuilder automatically configures the network to enforce the policies. Preferably, the passbuilder receives the policies from the netadmin and stores them in a machine-readable format (e.g., a policy file).

Only the passbuilder can configure the network. The users and netadmin depend on the passbuilder to configure and manage the network in a way that supports the policies. The netadmin is able to observe the pattern of communication of the network but may not be able to decrypt the content of the packets.

Every node on the network has one or more assigned network addresses, which may be reassigned by the passbuilder. The passbuilder also has one or more network addresses, each referred to as a passbuilder address. The passbuilder may use different passbuilder addresses for different purposes. For example, one may be used for configuring the network and another may be used for diagnostic reporting. In those embodiments in which the passbuilder does not maintain a durable connection to the network, the network address used for diagnostic reporting may correspond to a node acting as a diagnostic receiver that receives and stores diagnostic information (e.g., performance metrics or reports of irregularities) on behalf of the passbuilder until the passbuilder next connects to the network. Also, different nodes may be given different passbuilder addresses—even for the same function—to help distribute the workload of the passbuilder.

Authentication

Authentication on the network may be accomplished by a variety of methods, typically involving a challenge generated by the node checking authenticity and a response from the authenticating communicator. A successful response proves to the challenger that the authenticating party possesses or has access to one or more authenticating factors, such as a password, a private cryptographic key, a hardware token, or specific biometric information. These authenticating factors are referred to as credentials. Using methods such as public key infrastructure, authentication can take place without the challenger necessarily obtaining a copy of the credentials.

Credential-Holders

Communication on a SN takes place between credential-holders, which are users, hardware devices, and software entities, or combinations thereof, that have been vetted, provided credentials, and have the ability to send and receive SN packets. Each node on the network is a credential-holder, as is the passbuilder. Credential-holders, and any entities that communicate through them, are not necessarily trusted by one another.

Credentials may have an expiration date, and they may be revoked by the passbuilder at any time. The credentials allow the credential-holder to authenticate its identity to other nodes on the network and to the passbuilder to allow connection to and participation on the SN. The passbuilder, routers, and switches are also credential-holders on the network. Each credential-holder holds its own credentials and the passbuilder knows how verify that it holds them.

Passes

Each packet transmitted on a SN is governed by a pass issued by the passbuilder. Passes are associated with a pass identifier (pass ID), permissions, and, optionally, guarantees. The pass ID is a number or string that uniquely identifies the pass. The permissions of a pass specify the network addresses that can send packets under the pass and the network addresses to which those packets can be sent. The permissions may also limit the allowed time windows of transmission or the entry point to the network. In some cases, the permissions may also require that the credential-holder be in a particular state at the time of transmission (e.g., require that a particular user is logged into a credential-holder that is a software entity or an appliance). In this case, the credential-holder must assure that the condition holds (e.g., that the particular user is logged in) before transmitting a packet under the pass. Passes may also limit the peak bandwidth of connections under the pass or the maximum amount of information that is allowed to be transmitted over a specified time period.

Guarantees associated with a pass may include a minimum available bandwidth, a maximum latency, restrictions on the links that can be used for transmission, or the use of specified transmission methods to provide reliability or redundancy. The passbuilder is responsible for configuring the network in a manner that enables enforcement of the permissions and supports the guarantees of the passes that it issues. For example, if a pass is requested with a guaranteed minimum available bandwidth, and the passbuilder cannot configure the SN in a manner that delivers the requested bandwidth, then the passbuilder will not issue the requested pass. The passbuilder is also responsible for distributing the information necessary to enforce the restrictions of the pass to the nodes that may need to handle packets transmitted under the pass. It may do this proactively or on demand. For example, it could distribute all the pass information to all nodes. In the preferred embodiment, passes remain valid until they expire (e.g., as indicated by an expiration date, expiration time, or range of valid configurations) or are revoked by the passbuilder.

Adapters and Appliances

In some embodiments, a credential-holder may be a software entity that acts as a connector between the network and another software entity (such as an application or service) or hardware device. The connecting software entity functions as an adapter, communicating with the other entity or device through a protocol such as the Internet Protocol (IP). In these embodiments, the user interacts with the other software entity or hardware device, which communicates with the network through the adapter.

A particular type of edge node is an appliance, which is a device that is itself a credential-holder. For example, telephones or text messaging appliances can allow end users to communicate over a SN conveniently and in a secure manner. Appliances may support passes with permissions requiring the insertion of a physical key (such as an identity card) and/or collection of biometric information, utilizing sensors on the appliance, to reliably verify the identity of an end user (in addition to the authentication provided by the credentials of the credential-holding appliance itself).

Network Configurations

The configuration of the network defines a topology (e.g., an arrangement of links between the nodes to implement a topological structure for the SN) and routing behavior (e.g., via a routing table as described below), the network addresses of the credential-holders, and a set of valid passes. Issuing or revoking passes, issuing credentials and network addresses to credential-holders, and changing the topology or routing behavior of the network all require a new network configuration. Several network configurations may be active simultaneously. Each particular configuration of the network is identified by a unique, non-null ID called a configuration ID. In the preferred embodiment, the configuration ID increases monotonically over time (as new configurations are defined). This allows the passbuilder to specify a configuration ID after (i.e., above) which a pass will expire, as described above.

Packets

Communication between credential-holders is implemented by transmitting packets of information between the sending credential-holder (sender) and the receiving credential-holder (receiver). A collection of packets transmitted between a sender and a receiver, in service of a shared function or purpose, constitutes a message.

FIG. 1 shows a schematic representation of the structure of a SN packet according to a preferred embodiment. In the preferred embodiment, SN packets are IP6-compliant packets 100. The network addresses of the sender and receiver of the SN packet are stored in the source address 210 and destination address 220 fields of the IP6 header 200.

The SN header 250 includes the IP6 header, plus any additional header fields 310 stored in the payload 300 of the IP6 packet. Preferably, the additional header fields include a configuration ID 312. From the SN header, it is possible for a node to determine a pass ID.

In the preferred embodiment, the pass ID 311 is explicitly specified within the additional header fields. (In other embodiments, it may be inferred as described below.) The additional header fields also include a timestamp 313. The configuration ID, pass ID, and timestamp can each be 64-bit fields.

The pass ID references the pass that authorizes the nodes to transmit the packet through the network. The configuration ID references the configuration associated with the packet, which is the configuration under which it is sent, forwarded, and delivered. With the exception of startup packets (described below), the timestamp indicates the time at which the packet was transmitted in the associated configuration.

Each packet also preferably contains a hash 330, which may be stored at the end of the packet. The hash is generated by passing the concatenation of all other fields of the packet, including the timestamp, through a hash function. Depending on the policies, the hash may be a checksum or another type of hash (e.g., a cryptographic hash such as SHA-1). The hash is computed each time the packet is transmitted across a link and verified each time it is received by a node. If the hash computed upon receipt does not match the hash computed upon transmission, the packet is rejected by the node—in which case it is optionally reported, optionally logged, and then ignored (i.e., not transmitted).

The SN data payload 320 is also stored in the IP6 payload. The payload is optionally end-to-end encrypted in a manner agreed upon between the sender and receiver, in which case the passbuilder (and netadmin, by extension) may not be able to decrypt the payload.

Switching Nodes and Edge Nodes

All nodes that forward packets, such as routers and switches, are called switching nodes. The permissions of the pass identified by the pass ID are checked before a packet is forwarded, and the packet is only forwarded if the configuration of the packet is currently active and if the transmission complies with the permissions of the pass under that configuration. If not, the packet is rejected, as described above. The pass provides the permissions for switching nodes to transmit a packet from sender to receiver, but it does not necessarily specify a particular communication route.

Any node, including switching nodes, can have multiple communications ports, each connecting to a different link. At each transmission hop within the network along a communication route connecting a sender and receiver, the switching node determines the next link over which the packet will travel, based on the header information, and forwards it out of the corresponding port. The choice of outgoing link may depend on the configuration, the receiver's address, the pass, the size of the packet, the incoming link, the status of the links, other information in the header, and the presence of other packets passing though the switching node. In some embodiments, the determination of the appropriate link for forwarding a packet based, at least in part, on a routing table distributed as part of the configuration definition.

Edge nodes act as sources of and destinations for packets. Edge nodes may be clients, servers, or other network-connected devices. The properties and behaviors of edge nodes is not required to be fully under the control of the passbuilder; the passbuilder must merely control the vetting and issuance of passes to the credential-holder at the edge node. Each edge node has at least one link to a port of another node and that port is referred to as the edge node's entry point to the network.

Figure 2:
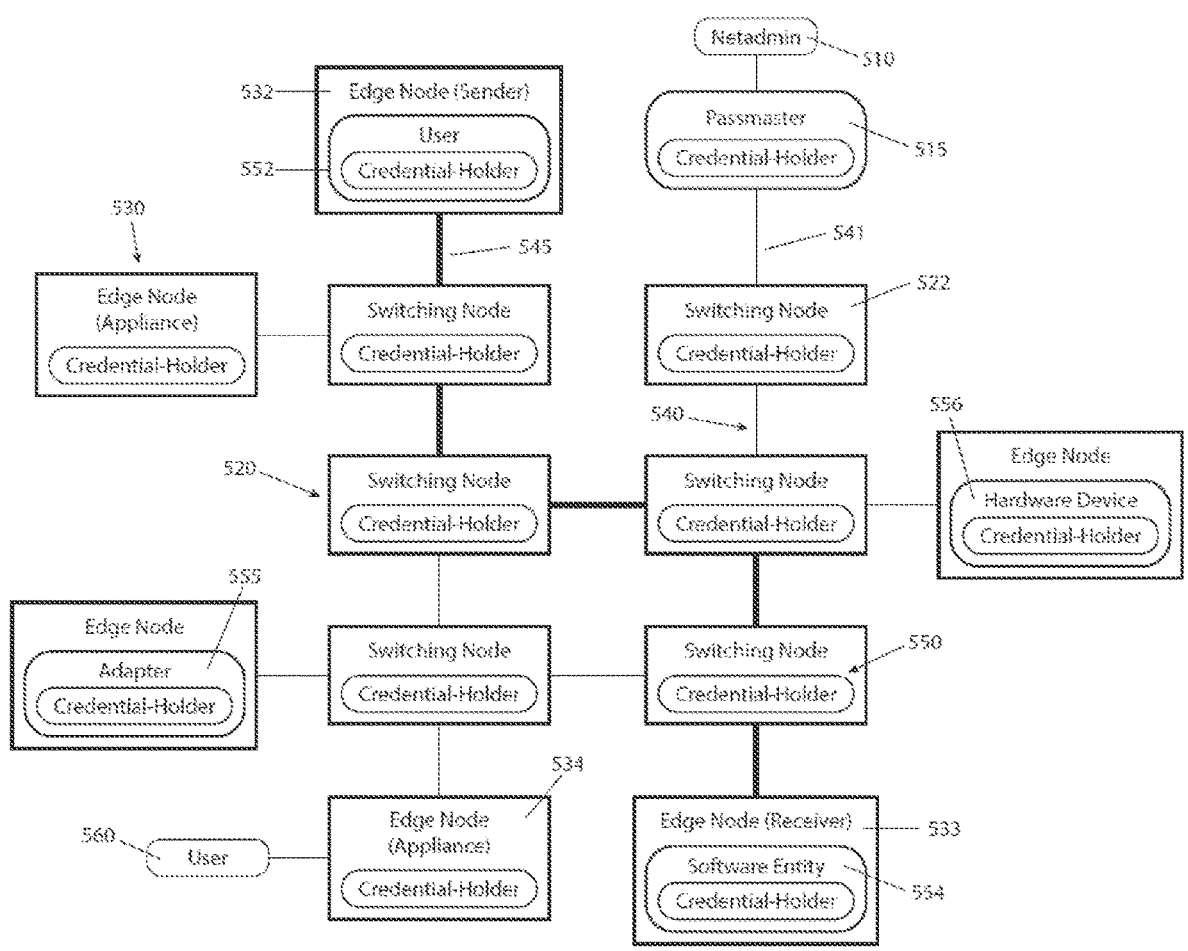
FIG. 2 shows a schematic representation of switching nodes, edge nodes, and links in a SN according to a preferred embodiment.

FIG. 2 shows a schematic representation of switching nodes, edge nodes, and links in a SN according to a preferred embodiment. As described earlier, the network is under the control of a netadmin 510 that specifies policies that are enforced by a passbuilder 515. Also shown within the secure network of FIG. 2 are multiple nodes, both switching nodes 520 and edge nodes 530, connected by links 540. Credential-holders 550 at edge nodes in the network include a user 552, a software entity 554 (in one instance, an adapter 555), and a hardware device 556. One edge node shown in FIG. 2 is an appliance 534 that is itself a credential-holder, supporting network interaction with a connected user 560. One of the switching nodes 522 assists in implementing the passbuilder by allowing the passbuilder connection 541 to the network. FIG. 2 also shows a communication route 545 comprising several links between a credential-holder at one edge node 532 (the sender) and a credential-holder at another edge node 533 (the receiver).

Admin Passes and Connections

The passbuilder can communicate with all nodes using admin passes. Like other passes, admin passes have associated pass IDs and permissions. These passes allow the passbuilder to establish admin connections that are preferably end-to-end encrypted between the passbuilder and the node.

Admin connections may be used by the passbuilder to distribute link keys—cryptographic keys that are used to encrypt and decrypt packets transmitted across links connecting pairs of nodes. The passbuilder also uses admin connections to provide the switching nodes with the information they need to forward packets and check the permissions of the passes for the packets they receive. This information may be preloaded before a configuration is activated. Alternatively, the switching node can use admin connections to request the information from the passbuilder when it is needed. In either case, the switching node may cache the information, associated with the appropriate configuration. The passbuilder also uses admin connections to assign network addresses, revoke passes, and activate and deactivate configurations.

Rejected Packet Reporting and Logging

As noted above, when a packet is rejected (and not transmitted to another node of the SN), it is optionally reported—either directly to the passbuilder or a diagnostic receiver, described above, acting on behalf of the passbuilder. Any reporting of rejected packets takes place under a pass that exists for this purpose. After receiving and reporting a fixed number of rejected packets within a certain time period at a certain port, a node will cease reporting each rejected packet and instead begin to keep count of the number of rejected packets that have not been reported, until instructed to do otherwise by the passbuilder or diagnostic receiver. This limited reporting and the bandwidth limit of the reporting pass ensure that the network cannot be compromised by an excessive volume of rejected packet reports. The node may also keep a log of some or all of the rejected packets it receives.

Issuing Credentials

The vetting of, issuing of credentials for, and configuration of switching nodes is performed by the netadmin via the passbuilder. For edge nodes, credentials may be issued by the passbuilder or by a credential issuer in coordination with and on behalf of the passbuilder. To enable this coordination, the credential issuer and the passbuilder authenticate themselves to one another and establish a means of authenticated communication. This authenticated communication channel may be a SN connection. The passbuilder provides the credential issuer with a set of startup addresses, one or more passbuilder addresses, the pass IDs of startup passes that allow communication with the passbuilder from the startup addresses, and, optionally, a list of supported authentication factors.

The vetting authority, whether the passbuilder itself or a credential issuer on behalf of the passbuilder, is responsible for vetting a candidate credential-holder before providing it with credentials. Vetting a candidate credential-holder may require physical or virtual interaction to evaluate the identity and integrity of the candidate credential-holder.

When a new credential-holder is successfully vetted, the vetting authority provides it with credentials from among the list of supported authentication factors that give it an authenticable identity on the network. For example, a credential-holder may be issued or instructed to generate a private key paired with a public key that is accessible to the passbuilder.

These credentials can subsequently be used to authenticate the identity of the credential-holder and enable authenticated communication.

The vetting authority also assigns the credential-holder one or more startup addresses and pass IDs of startup passes, received from the passbuilder, that allow it to communicate with the passbuilder, and optionally other nodes, from the startup addresses. The vetting authority also assigns the credential-holder one or more descriptions, including a credential-holder ID and, optionally, one or more names or functional descriptions, for example Uniform Resource Locators (URLs), that allow the new credential-holder to be referenced by other credential-holders. The vetting authority may also issue, or cause to be issued, a cryptographically-signed certificate that connects a public key of the credential-holder to one or more of its names or descriptions. The new credential-holder is provided with its assigned startup address(es) and with at least one passbuilder address. Optionally it may also be provided with the descriptions that were assigned, and any certificates that were issued.

After a credential-holder has been issued credentials by a credential issuer, the credential issuer uses the authenticated communication channel to inform the passbuilder of the credential-holder ID and other names and functional descriptions, the assigned startup address(es), and the authentication factors required to authenticate the credential-holder. It may also specify restrictions on where the credential-holder's entry point is allowed to be on the network and when the credentials are valid. For example, it may set an expiration time for the credentials. The credential issuer may also use the authenticated communication channel with the passbuilder to subsequently ask the passbuilder to revoke credentials.

Startup Passes

Startup passes allow nodes with startup addresses to communicate with the passbuilder from the assigned startup addresses, at limited bandwidth. The IDs of the passes are provided to the credential-holder with the startup addresses. As described below, transmission of startup packets allows the passbuilder to determine the entry point for the new credential-holder upon receipt of an initial message under the startup pass. Upon receiving startup messages, the passbuilder can assign new network addresses to the new credential-holder, create a new configuration of the network which routes messages to the new credential-holder, and issue new passes that allow further communication with the credential-holder, and give the credential-holder the information required to send packets under the new passes. The passbuilder may also ignore the startup packet; for example if the policies do not allow it to connect at that time or entry point.

Issuing New Passes

New passes can be created by the passbuilder at the request of either the netadmin or the communicating credential-holders. A pass issued at the request of the communicating credential-holders requires that all communicating credential-holders, or an authorized representative, make matching requests to the passbuilder. A request specifies a set of desired permissions and guarantees.

Depending on the policies established by the netadmin, the passbuilder may require additional credentials from a requesting credential-holder, such as the credentials of a user logged into the credential-holder (e.g., if the edge node is an appliance) or evidence of the current state of the credential-holder (e.g., if the credential-holder is a hardware device). Also depending on the policies, the additional credentials may need to be verified by the passbuilder through out-of-band communication; for example via direct communication with the netadmin.

In one embodiment, one credential-holder can discover another and initiate the pass request process by asking the passbuilder for an introduction. The credential-holder sends the passbuilder a message (e.g., under an admin pass for requesting introductions) that includes a description of the other credential-holder(s) and the desired permissions and guarantees of the requested pass. Alternatively, one credential-holder can discover another through a domain name server and send the passbuilder a message including only the desired permission and guarantees of the requested pass. In the preferred embodiment, for some nodes within the SN, a pass is only issued by the passbuilder if all the communicating credential-holders issue matching requests. For such nodes, upon receiving a request from one node the passbuilder may then choose, based on the policies, to forward the request to the other credential-holder or credential-holders and await a matching request. The amount of time allowed to elapse while awaiting matching requests—after which the request is "timed out" and no longer considered valid—is determined by the policies. For other nodes within the SN, the may issues passes for non-matching requests.

The passbuilder will only issue a pass if the requested guarantees can be met and the guarantees and permissions are compliant with the policies. Before the pass is issued, the passbuilder creates a new configuration of the network that recognizes and enforces the permissions and provides the guarantees of the new pass. After informing the nodes of the information necessary to support the new configuration, the passbuilder activates the new configuration and sends the newly issued pass ID and the new configuration ID to the communicating credential-holders. From that point on, the credential-holders can communicate directly, without the intervention of the passbuilder.

The passbuilder can revoke a pass for any reason; for example, at the request of the netadmin or one of the communicating credential-holders. To fully revoke a pass, the passbuilder reconfigures the network to no longer accept the pass. Alternatively, the passbuilder can effectively revoke a pass without creating a new configuration by instructing the receiving credential-holders and/or switching nodes to ignore any communications received under the pass ID.

Links and Link Encryption

Links form point-to-point connections between nodes of the network, including switching nodes and edge nodes. In practice, the links may be hardwired or wireless connections, or a communication pathways through another network, such as the Internet. In the latter case, a SN link can be a transport-layer Internet connection, established by a protocol like TLS, which allows each end of the link to confirm its identity to the other and agree upon and establish a link key for encryption of information traveling across the link.

The headers and hashes, and optionally the data payloads, of packets traveling across an SN link are point-to-point encrypted using the link key. A single link key is preferably used to encrypt and decrypt the data (e.g., using a symmetric cipher such as AES). The point-to-point encrypted information must be decrypted at each switching node to examine the header and hash to facilitate onward routing. This does not require decrypting the optional end-to-end encryption of the data payloads (320 in FIG. 1). As noted above, the link key or keys used for link encryption between two nodes can be distributed by the passbuilder. Alternatively, the link keys may be negotiated or requested by the end nodes using a protocol such as TLS.

In some cases, the protocols that implement a link may break SN packets into smaller packets or frames and then reassemble them, but the result is the transmission of complete SN packets across the link. Alternatively, the protocols may encapsulate SN packets and send them as payloads inside other types of packets, such as IP4 packets.

Establishing a Link

Figure 3:
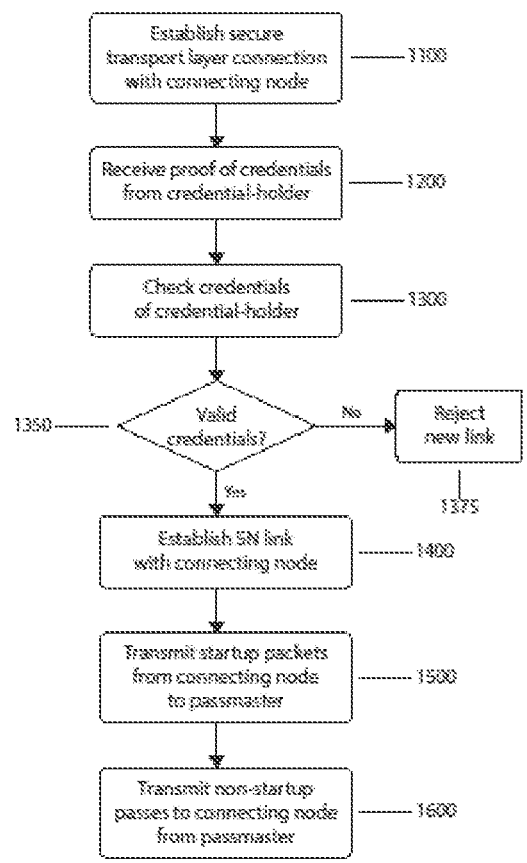
FIG. 3 shows a flow chart summarizing a process by which a new edge note connects to the SN according to a preferred embodiment.

For an edge node to connect to a SN, a new link must be established between the connecting node and a SN node. FIG. 3 shows a flow chart summarizing a process by which a new edge node connects to the SN according to a preferred embodiment. The process establishes a cryptographically secure link to the node at the entry point, called the entry node, and authenticates the credentials of the credentials-holder at the connecting node. To begin the process, the entry node establishes 1100 a cryptographically secure transport layer connection with the connecting node. The entry node may establish the connection proactively or in response to a request from the connecting node. In the preferred embodiment, the connection is established using a protocol such as Transport Level Security (TLS), as described above, which also allows the connecting node and entry node to agree upon a link key. Once established, the connection serves as a cryptographically secure link over which the entry node receives 1200 proof of credentials from the credential-holder at the connecting node. The entry node then checks 1300 the credentials of the credential-holder to confirm the identity of the credential-holder and verify that it is allowed to connect to that entry point at that time. As noted above, receiving proof of and checking the validity of the credentials does not necessarily require that the entry node obtain a copy of the credentials from the credential-holder. Using techniques well-known in the art (e.g., zero knowledge proofs) the credential-holder can demonstrate possession of or access to valid credentials without sharing the credentials with the entry node.

If entry node determines 1350 that the credentials are not valid, it rejects 1375 the new link, and no connection is made between the connecting node and the SN. If the entry node determines 1350 that the credentials are valid, it receives 1400 a network address from the connecting node. For example, it may receive the startup address assigned to the credential-holder upon issuance of credentials to the credential-holder at the connecting node. The received network address allows the entry node to check the source address of future packets arriving at the entry point. The credentials and network address provided by the connecting node may be transmitted upon request of the entry node or proactively by the connecting node upon requesting a connection to the SN. In either case, the information is transmitted via the cryptographically secure link between the connecting node and entry node. The entry node then establishes 1500 an authenticated link from the connecting node into the SN at the entry point.

Once the connecting node establishes an authenticated link into the SN, it may send startup packets under startup passes. The entry node receives and transmits 1600 these packets to the passbuilder. The passbuilder can use the authenticated link to assign new network addresses to the credential-holder at the edge node and give the credential-holder the information required to send packets under non-startup passes, such as pass IDs and the permissions of the corresponding passes. The pass master also uses the authenticated link to give the connecting node a currently active configuration ID. The entry node transmits 1700 this information to the connected node.

In the preferred embodiment, possession by the connected node of the link key established for the cryptographically secure link to the entry point provides ongoing verification of the authenticated link. That is, receipt of properly encrypted packets by the entry node from the connected node effectively serves as an ongoing authentication of the credential-holder at the connected node. Direct, continued authentication of the credential-holder's credentials is not required.

In some embodiments, if the credentials provided by a credential-holder in establishing an authenticated link are revoked (by the passbuilder or credential issuer on behalf of the passbuilder) or expire, then the authenticated link is removed from the SN. This allows the passbuilder to uniformly deny an individual credential-holder the ability to communicate within the SN. Alternatively, or in addition, the passbuilder may more finely deny the credential-holder the ability to communicate through the revocation of individual passes previously issued to the credential-holder, as described above.

Timekeeping, Time Horizon, and Maximum Configuration Lifetime

Especially in embodiments where the links between nodes are not inherently resistant to replay attacks (i.e, at the transport level, as in the case of links established using TLS), a SN may adopt a timekeeping system to provide improved security. Each node keeps track of the length of time that each active configuration has been active, using a timekeeping system that is incremented at a rate not less than the maximum rate at which packets can be transmitted by the node. Preferably, the timekeeping system measures time in proportion to the number of bits that could have been transmitted over an outgoing link since the configuration became active, plus one. This timekeeping system has sufficient precision to assign a different non-zero timestamp to each packet, ensuring that each packet will always be timestamped later than prior packets sent on the same link under the same configuration. Preferably, the timekeeping system is implemented with a hardware clock, computing a timestamp by subtracting the clock time that a configuration became active from the current clock time. Alternatively, the timestamp may be a count of the number of packets that have transmitted across the link. The timekeeping system need not be the same at each node.

Each node keeps track of a time horizon for incoming packets on each incoming link for each active configuration. The time horizon is set to zero for a new configuration when it becomes active. Except for startup packets (described later), a node will not accept a packet from a link unless its timestamp is later than the time horizon for the packet's incoming link and configuration. When a packet is successfully received, the time horizon of the link on which it was received in that configuration is advanced to the timestamp of the received packet.

An advantage of using a timekeeping system that is invariant with respect to packet volume, such as the preferred timekeeping system describe above, is that it is possible to determine how long a configuration can be active before the time cannot be stored in the timestamp field. The passbuilder does not allow the lifetime of any configuration to exceed a maximum configuration lifetime, as measured by the timekeeping system of any node. The timestamp field is large enough to represent any possible time within the maximum configuration lifetime.

These behaviors, combined with the verification of the hash upon receipt of a packet, make the network resistant to replay attacks. A reset of the timekeeping system of a node (e.g., if the timekeeping system was nearing the maximum configuration lifetime) does not compromise this resistance because the reset entails a new configuration, and subsequent hash computations will incorporate the new configuration ID.

Configuration Control

Any change in network topology, routing behavior, the set of valid passes, credentialed credential-holders, or credential-holder network address assignments requires a new configuration. As described above, each packet carries a configuration ID referencing the configuration that it is transmitted under. At any given time, the network may transmit traffic under at least two active configuration IDs, called current and next, allowing the passbuilder to designate a new network configuration and retire an old network configuration in a controlled and preferably tested manner.

Figure 4:
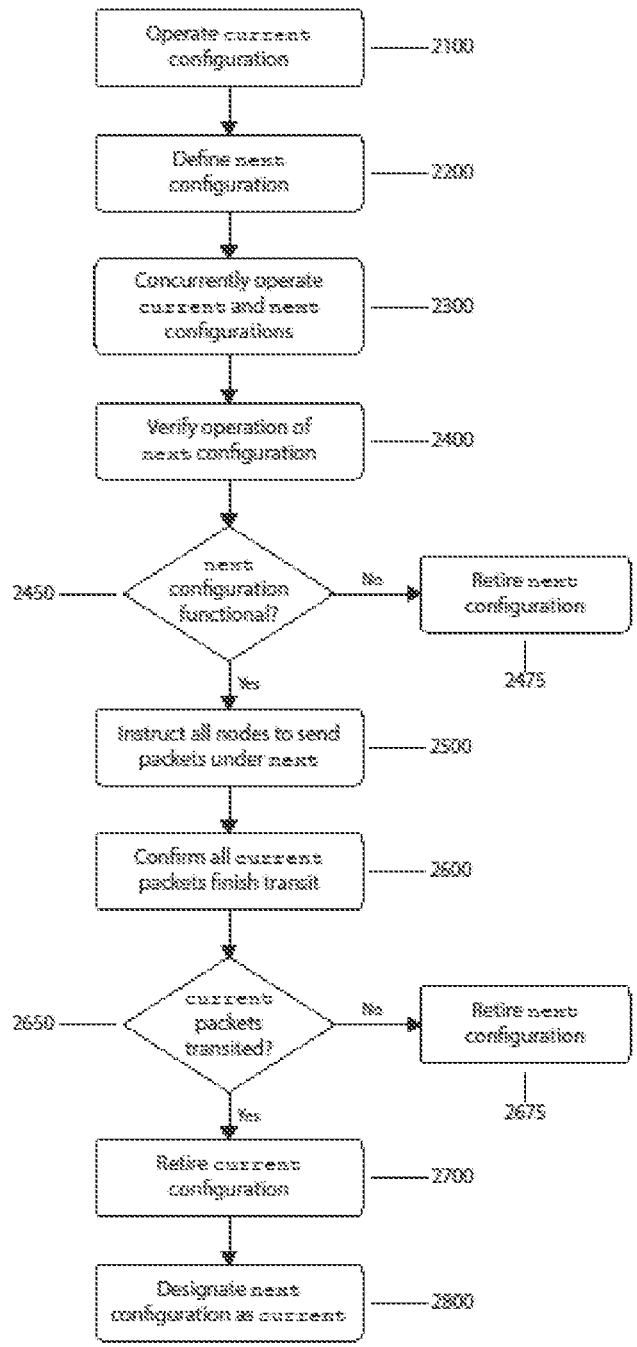
FIG. 4 shows a flow chart summarizing a process by which a passbuilder replaces a current network configuration with a next network configuration through concurrent operation of the two network configurations according to a preferred embodiment.

FIG. 4 shows a flow chart summarizing a process by which a passbuilder replaces a current network configuration with a next network configuration through concurrent operation of the two network configurations according to a preferred embodiment. The process begins with the passbuilder operating 2100 the current network configuration. When a new configuration is required, for instance upon the issuance of a new pass or the connection of a new edge node, the passbuilder defines 2200 the new configuration as the next configuration. The passbuilder then concurrently operates 2300 the next and current configurations. Specifically, the passbuilder operates the next configuration in a test mode, in which the network verifies 2400 that the packets that are delivered under the current configuration would also be delivered under the next configuration. If the passbuilder determines 2450 that the next configuration is not fully functional (e.g., such that the packets would not be delivered to their proper destination), it retires 2475 the next configuration. If the passbuilder determines 2450 that the next configuration is fully functional, it instructs 2500 credential-holders to only send packets under the next Configuration. Thereafter, the passbuilder confirm 2600 that all packets with a configuration ID for the current configuration have finished their transit through the network by waiting for an interval of time greater than the maximum transit time of a packet or by receiving information from switching nodes. Once all credential-holders have been so instructed and the passbuilder has determined 2650 that all packets with the current configuration ID are no longer in transit through the network, the passbuilder retires 2700 the current configuration by instructing the switching nodes to stop handling packets with current and to designates 2800 the next configuration as the current Configuration. In this manner, new links may be added to a SN before old links are removed, with both the old and new topology supported during the changeover.

Startup Packets

As described earlier, a credential-holder must connect to the network before it can fully communicate on a SN. It may do this when it powers up, when it is physically plugged into the network, or just before attempting to communicate via the SN. When a credential-holder first connects to the network, it may create a new link to an entry point, as described above, without yet knowing the current configuration number. To begin communicating on the SN, the credential-holder at the connecting node, can utilize its startup address and a passbuilder address provided upon issuing credentials as the source and destination address to transmit startup packets under startup passes. Preferably, startup packets have a reserved configuration ID, such as zero, and a zero timestamp.

When the passbuilder receives a startup packet, it either assigns a new network address to the credential-holder at the connecting node or uses the credential-holder's pre-assigned address. The passbuilder generates a new configuration so that messages addressed to the new credential-holder will be delivered to it in the next configuration. It also informs the connecting node of its address and the next configuration.

To provide resistance against a possible denial-of-service attack, the startup passes authorize only very limited bandwidth, ensuring that spurious messages simultaneously sent under startup passes at a large number of entry points will not adversely affect the performance of the network. The policies may also require a node to wait a pseudo-random delay before forwarding a packet under a startup pass. The passbuilder takes the maximum possible resources required to handle startup passes into account when allocating network resources.

Startup packets can also be trace packets. Whether or not a packet is a trace packet can be determined from the pass specified by the packet's pass ID. When forwarding a trace packet, each switching node appends identifying information, such as the node's network address and the port that it arrived on, to the data payload of the trace packet. Once the data payload reaches a maximum allowed size, no new information is appended. This allows the passbuilder to trace the sequence of nodes through which the trace packet was routed. This functionality is used to discover the topology of a connecting node's connection to the network with a startup packet. In the preferred embodiment, the data payload size of a trace packet is a single network address and port number, which specifies the location of the entry point of the connecting node into the network.

Switching Node Behavior

Figure 5:
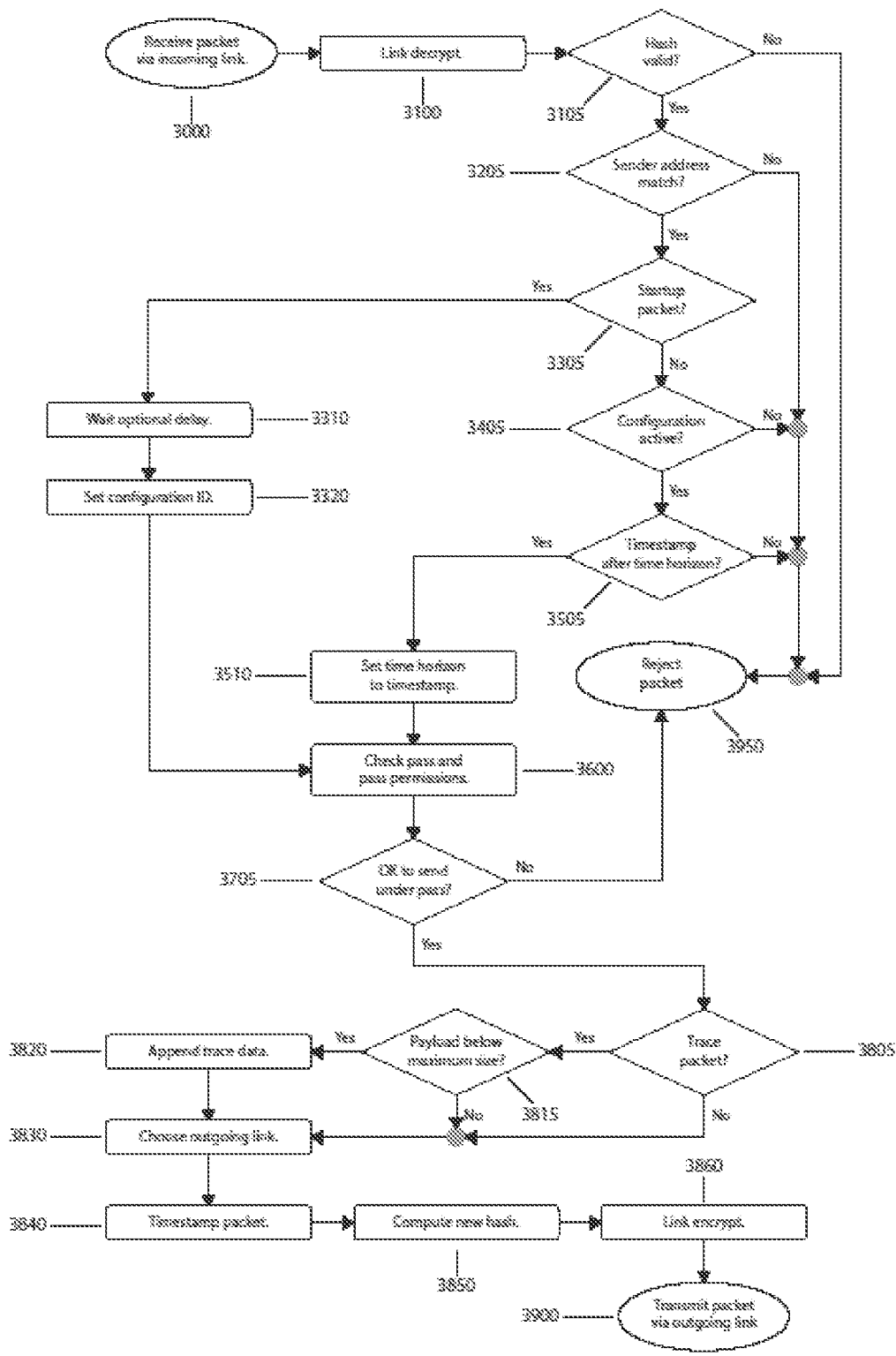
FIG. 5 shows a flow chart summarizing the handling of a SN packet by a switching node according to a preferred embodiment.

FIG. 5 shows a flow chart summarizing the handling of a SN packet by a switching node according to a preferred embodiment. When the switching node receives 3000 a packet via an authenticated incoming link, it first decrypts 3100 the link encryption. The switching node then determines 3105 whether the hash computed upon receipt matches the hash computed upon transmission. If not, the switching node determines that the hash is invalid and rejects 3950 the packet.

If the hash matches, and the switching node is an entry node, the switching node then determines 3205 whether the sender address matches the network address, in the configuration referenced by the configuration ID of the packet, provided by the edge node upon establishing the authenticated incoming link. If not, the switching node rejects 3950 the packet. This ensures that the sender addresses of all packets coming from edge nodes have been verified upon entry into the network.

If the sender address matches, the switching node then determines 3305 whether the packet is a startup packet. If so, the switching node optionally waits 3310 for a delay time. In some embodiments, the delay is a random delay time selected from a distribution of delay times with an average duration sufficient to mitigate the possible adverse effects of an attack abusing the permissions associated with startup passes. The switching node then sets 3320 a configuration ID for the packet.

If the packet is not a startup packet, the switching node determines 3405 whether the configuration referenced by the configuration ID within the packet is an active configuration. If not, the switching node rejects 3950 the packet.

If the referenced configuration is active, the switching node then determines 3505 whether the timestamp within the packet is after the time horizon for the incoming link for the referenced configuration. If not, the switching node rejects 3950 the packet and, therefore, the packet is not transmitted further to other nodes of the SN.

If the timestamp is after the time horizon, the switching node sets 3510 the time horizon for the incoming link for the referenced configuration to the current timestamp.

After setting 3320 the configuration ID of a startup packet or setting 3510 the time horizon upon receipt of a non-startup packet, the switching node checks 3600 the pass and pass permissions. Specifically, the switching node checks whether the pass referenced by the pass ID is a currently valid pass (e.g., has not expired or been revoked by the passbuilder) and that permissions associated with the pass permit transmission of the packet from the specified sender to the specified receiver under the referenced configuration. If the switching node determines 3705 that the permissions do not permit transmission of the packet, the switching node rejects 3950 the packet.

If the switching node determines that the permissions do permit transmission of the packet, the switching node then determines 3805 whether the packet is a trace packet. If the packet is a trace packet, the switching node determines 3815 whether the data payload of the trace packet is below the maximum allowed size. If so, the switching node appends 3820 identifying information to the data payload of the trace packet.

After appending 3820 trace data, determining 3805 that a packet is not a trace packet, or determining 3815 that a trace packet data payload is not below the maximum allowed size, the switching node chooses 3830 an outgoing link. The switching node then timestamps 3840 the packet, computes 3850 a new hash, and encrypts 3860 the packet using the link encryption. Finally, the switching node transmits 3900 the packet via the chosen outgoing link.

Network Addresses

Each credential-holder is assigned one or more network addresses in a given configuration. The network addresses are assigned to the credential-holder by the passbuilder and can be changed by the passbuilder. In the preferred embodiment, no two credential-holders are assigned the same network address in the same configuration so it is possible to determine the credential-holder from a network address and configuration ID. Each packet header has a sender and receiver address. All packets sent under a configuration will specify one of the network addresses of the sending credential-holder as the sender. Packets addressed to any of the network addresses of a credential-holder are delivered to that credential-holder in the configuration specified by the configuration ID of the packet.

Pass permissions specify which network addresses may send or receive under the pass, and the sender must specify a receiver address or addresses in the packet that are compatible with the permissions. The permissions may specify a single network address or a group of network addresses specified by a collection of single addresses and/or block addresses. Block addresses specify a pattern of related addresses defined by a partially specified address in which some bits are fixed and others can take on any value, as may be indicated, for example, by pairing a fixed address with a bit mask. Groups of single network addresses and block addresses may also be used to specify permissions and credential-holder network address assignments. The sender and receiver addresses in a packet must each be single network addresses.

Preferably, part of the network address indicates the location of the node within the routing hierarchy of the network, to help simplify the routing of packets. Other parts of the network address may indicate the group that the address is a member of and the network address of the credential-holder within that group. This facilitates the use of block addressing to specify useful groups of addresses. Because a credential-holder can have multiple network addresses, it can participate in multiple groups.

Multicasting and Enclaves

Passes that refer to communicating pairs of single network addresses are only sufficient for point-to-point communication. Other patterns require permissions involving groups of network addresses. These groups can be established by the netadmin or by the participating credential-holders. In the latter case, a pass can be issued through a proxyholder, which is a credential-holder that has been given limited permission to be an authorized representative to request passes that communicate with network addresses assigned to participating credential-holders. The participating credential-holders can grant the proxyholder this power by informing the passbuilder of the proxy and its limitations, such as constraints on network addresses, constraints on bandwidths, and additional certifications required. The proxyholder is then able to request passes with permissions allowing communication with network addresses assigned to the participating credential-holders, within those limitations. The IDs of these passes are then distributed to the participating credential-holders. For example, the credential-holder assigned all network addresses within a block address can designate itself a proxyholder and request passes for communication within that block address. A single group can have multiple proxyholders.

One use of this capability is multicast groups, in which a message sent to a single network address, typically a network address assigned to a proxyholder, is broadcast to all the participating credential-holders. Another use is the establishment of enclaves of credential-holders that can communicate more freely among themselves. An enclave may have one or more associated domain name servers to allow participating credential-holders to find the network addresses of other participating credential-holders based on description. These network addresses may change when the configuration changes, so the name servers are preferably also proxyholders. Proxyholders are always informed when network addresses for which they hold proxies are reassigned.

Internetworking

Communication between different SNs requires a router that is a credential-holder on each network. The router that connects the networks keeps track of the mapping between network addresses on each network and uses this information to relay packets from one network to the appropriate addresses on the other. Routers can communicate directly with one another through a link, or indirectly through an internetwork that runs SN protocols. A hierarchy of such relationships may exist, allowing nesting of SNs. Internetworking through such a hierarchy requires separate passes on each SN.

Use of Non-SN IP6 Switching Nodes

In the preferred embodiment, SN packets are compliant with IP6 protocols. SN packets can thus travel through non-SN IP6 switches and over non-SN IP6 links before entering the SN, but the permissions and guarantees of the referenced passes will not be enforced until they enter the SN. For example, hardware devices connecting to the network through a non-SN local area network (LAN) may be able to interfere with one another's communication before entering the SN.

Inferred Pass IDs

If the netadmin adopts a policy for issuing passes that allows only one pass for communication between a given sender and receiver in a given configuration, the pass ID may be inferred from the combination of the sender and receiver addresses and configuration ID of a packet. Under such a policy, credential-holders at communicating nodes that require multiple passes can be assigned multiple addresses.

In another alternative embodiment, each packet has a pass ID field and a default pass ID, such as zero, that is used on passes for which the pass ID has not yet been specified. If a switching node encounters the default pass ID, it infers the pass ID from the source and destination addresses and the configuration ID. Having done so it can replace the default pass ID with the inferred pass ID before forwarding the packet, avoiding the need to infer a pass ID at each subsequent step through the network.

Deploying a SN as a Distributed Internet Checkpoint

A SN can be used as a distributed checkpoint in the Internet that allows only authorized packets to pass between authenticated communicators. This may be used, for example, to allow only authenticated and authorized transport level connections between clients and a server. To accomplish this, the IP6 address of a SN node is broadcast in the Internet's Domain Name System as a proxy for the server. Software or hardware installed on the client at the server's request intercepts packets addressed to SN addresses and routes them through an adapter, which can be a piece of software resident on the client or a device that connects the client and the Internet. The adapter is a credential-holder that converts IP packets addressed to known-to-be SN addresses into SN packets. This may require address translation and requires the addition of SN header information and the computation of the hash. The adapter determines whether an address is a SN address by comparing it against a description (e.g., a group) of SN addressees. The adapter does not modify packets passing through it unless they are addressed to SN addresses.

Before communicating with the server via the SN, the adapter must obtain the SN address of the actual (i.e., non-proxy) server, establish a link to a SN entry point, obtain a pass that allows communication, and obtain a configuration ID and timestamp. The adapter must do all of this before transmitting SN packets to the server. To obtain the address and pass ID, the adapter establishes a secure connection to the proxy over the Internet and uses the secure connection to query the proxy for the required information. If desired, the credential-holder then establishes a link to the SN, either over the secure connection to the proxy or to some other entry point. Once the client is able to send SN packets to the actual sever it may use this ability to establish an end-to-end secure connection through the SN to the server using a protocol such as TLS.

In one configuration of such a checkpoint, the client and server are edge nodes that link to a common switching node which is also the proxy. Methods well known in the state of the art, such as anycast addressing, can allow any one of multiple computers to perform the function of the proxy and/or the actual server.

Specific Security Benefits of a SN

In a SN, every packet is authenticated to ensure that it actually came from the sender specified within the packet. If the packet was generated by an edge node, then it came over an authenticated link to its entry point, where it was checked to verify the address actually assigned to the sender. If the packet was generated by a switching node or the passbuilder, then the configuration of the sender was under the control of the passbuilder.

The harm that can be done by a malicious or compromised edge node is limited by the passes associated with its credentials. Since these passes provide limited bandwidth and restrict destinations, such a node is not capable of generating the traffic required for an effective denial-of-service attack. Nor is it able to send packets to any credential-holder that has not agreed to communicate with it. As noted above, while it is possible for the edge node to generate spurious startup packets, the extra work required for the network to handle to these packets is strongly limited.

If a malicious "man in the middle" is able to intercept, modify or inject (at the transport level) packets traveling over a SN link, the harm it can cause is limited. It may block packets, but if needed they will be re-transmitted by the transport layer connection and eventually rerouted across another link. The "man in the middle" will not be able to generate inauthentic packets with a correct hash without knowing the encryption key for the link. Nor will it be able to replay intercepted packets, because of the timestamp.

Even if a malicious party manages to gain access to a SN switching node, it will only be able to (1) block packets travelling through that node or (2) inject invalid packets to nodes for which (a) the switching node holds passes or (b) the malicious party is able to guess a valid pass ID. As noted above, in the first case, blocked packets will likely be re-transmitted. In the second case, it is difficult for a compromised node to determine a valid pass ID that can be used to transmit packets between a given sender and receiver if it does not already have it. The large number of possible pass IDs makes it unlikely that a random ID will work successfully. And even if packets are injected using a pass already in possession of the switching node, since all connections may also be protected by end-to-end encryption, the injected packets will likely be rejected upon receipt. Additionally, the packets created by a compromised switching node also have limited ability to deny service by flooding network resources, since they are limited in bandwidth and destination address by their passes. Finally, as noted above, the rejection of packets may be reported to the passbuilder by the receiving node, allowing the passbuilder to identify and isolate the compromised link or switching node and prevent further damage to the network.

Processing System

Figure 6:
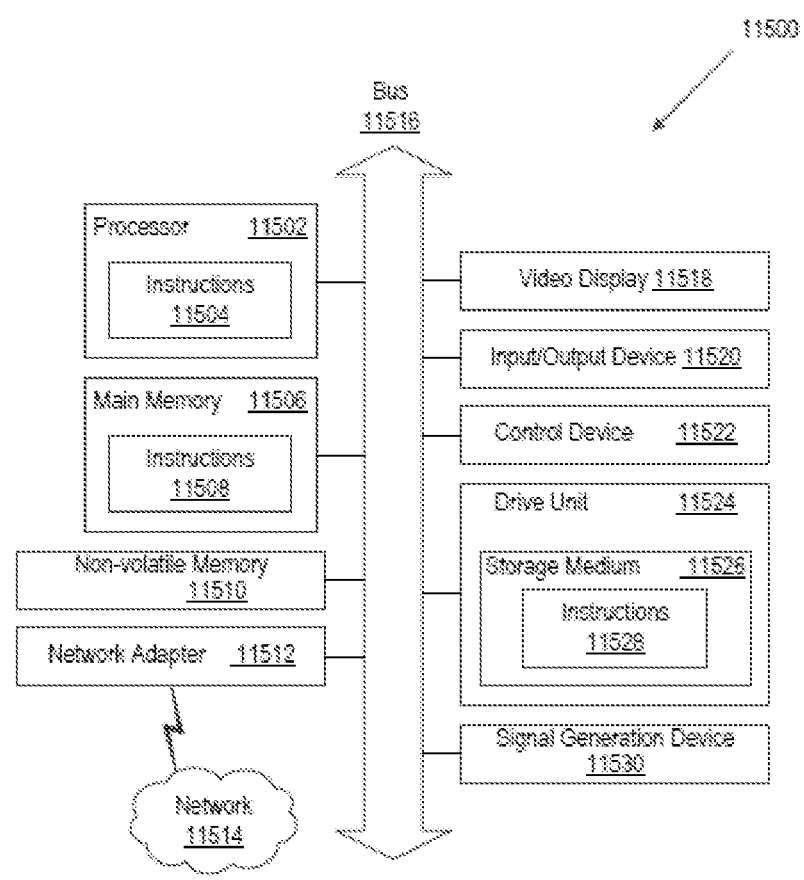
FIG. 6 illustrates an example of a device for implementing a SN.

FIG. 6 illustrates an example of devices for implementing a passbuilder, sender, receiver, or any of the nodes or other devices or functionalities described herein. For example, FIG. 6 is a block diagram illustrating an example of a processing system 11500 in which at least some operations described herein can be implemented.

The processing system 11500 may include one or more central processing units ("processors") 11502, main memory 11506, non-volatile memory 11510, network adapter 11512 (e.g., network interface), video display 11518, input/output devices 11520, control device 11522 (e.g., keyboard and pointing devices), drive unit 11524 including a storage medium 11526, and signal generation device 11530 that are communicatively connected to a bus 11516. The bus 11516 is illustrated as an abstraction that represents one or more physical buses and/or point-to-point connections that are connected by appropriate bridges, adapters, or controllers. The bus 11516, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 11500 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 11500.

While the main memory 11506, non-volatile memory 11510, and storage medium 11526 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 11528. The term "machine-readable medium" and "storage medium" shall also be taken to include any medium that is capable of storing, encoding, or carrying a set of instructions for execution by the processing system 11500.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 11504, 11508, 11528) set at various times in various memory and storage devices in a computing device. When read and executed by the one or more processors 11502, the instruction(s) cause the processing system 11500 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 11510, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 11512 enables the processing system 11500 to mediate data in a network 11514 with an entity that is external to the processing system 11500 through any communication protocol supported by the processing system 11500 and the external entity. The network adapter 11512 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 11512 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

We claim:

1. A secure network enabling secure transmission of information comprising:
   a plurality of computing devices connected by links, said plurality of computing devices including an entry computing device; and
   a credential-holder at a connecting computing device seeking to establish a new link to said secure network at said entry computing device, the credential-holder at the connecting computing device including a pass that authorizes transmission of a data packet from the credential-holder to the entry computing device so long as the data packet is within multiple network-specific parameters defined for the pass,
   wherein said entry computing device permits establishment of said new link as an authenticated link with said connecting computing device based on said credential-holder demonstrating possession of or access to valid credentials that includes information authenticating an identity of the credential-holder;

wherein, upon establishing said authenticated link, said connecting computing device and said entry computing device establish a link key for encrypting information transmitted via said authenticated link, and wherein future demonstration of possession of said link key by said connecting computing device provides said entry computing device with ongoing verification of said authenticated link.

2. The secure network of claim 1, wherein each of said computing devices previously joined said secure network by establishing an authenticated link with at least one other of said computing devices.

3. The secure network of claim 1, wherein said credential-holder demonstrates possession of or access to valid credentials by successfully responding to a challenge from said entry computing device.

4. The secure network of claim 1, wherein transmission of information over said authenticated link requires ongoing verification of said valid credentials.

5. The secure network of claim 1, additionally comprising:
a passbuilder that configures said secure network,
wherein said passbuilder is configured to issue and revoke said valid credentials.

6. The secure network of claim 1,
wherein, upon said connecting computing device seeking to establish said new link, said entry computing device receives a network address from said connecting computing device, and
wherein, upon receipt of a packet of said information over said authenticated link, said entry computing device transmits said packet to another of said computing devices based on said packet comprising a sender address that matches said network address.

7. The secure network of claim 1, wherein said credentials comprise one or more of:
a password,
a cryptographic key,
a hardware token, or
biometric information.

8. A method comprising:
establishing, by one or more processors, links connecting a plurality of computing devices of a secure network, said plurality of computing devices including an entry computing device;
determining, by one or more processors, that a credential-holder at a connecting computing device is seeking to establish a new link to said secure network at said entry computing device, the credential-holder at the connecting computing device including a pass that authorizes transmission of a data packet from the credential-holder to the entry computing device so long as the data packet is within multiple network-specific parameters defined for the pass; and
establishing, by one or more processors, said new link as an authenticated link with said connecting computing device based on said credential-holder having possession of or access to valid credentials that includes information authenticating an identity of the credential-holder,
wherein, upon establishing said authenticated link, said connecting computing device and said entry computing device establish a link key for encrypting information transmitted via said authenticated link, and
wherein future demonstration of possession of said link key by said connecting computing device provides said entry computing device with ongoing verification of said authenticated link.

9. The method of claim 8, wherein each of said computing devices previously joined said secure network by establishing an authenticated link with at least one other of said computing devices.

10. The method of claim 8, wherein said credential-holder demonstrates possession of or access to valid credentials by successfully responding to a challenge from said entry computing device.

11. The method of claim 8, wherein transmission of information over said authenticated link requires ongoing verification of said valid credentials.

12. The method of claim 8, further comprising:
establishing a passbuilder that configures said secure network,
wherein said passbuilder is configured to issue and revoke said valid credentials.

13. The method of claim 8,
wherein, upon said connecting computing device seeking to establish said new link, said entry computing device receives a network address from said connecting computing device, and
wherein, upon receipt of a packet of said information over said authenticated link, said entry computing device transmits said packet to another of said computing devices based on said packet comprising a sender address that matches said network address.

14. The method of claim 8, wherein said credentials comprise one or more of:
a password,
a cryptographic key,
a hardware token, or
biometric information.

15. A computer program product, comprising one or more non-transitory computer-readable media having computer program instructions stored therein, said computer program instructions being configured such that, when executed by one or more computing devices, said computer program instructions cause said one or more computing devices to:
establish links connecting a plurality of computing devices of a secure network, said plurality of computing devices including an entry computing device;
determine that a credential-holder at a connecting computing device is seeking to establish a new link to said secure network at said entry computing device, the credential-holder at the connecting computing device including a pass that authorizes transmission of a data packet from the credential-holder to the entry computing device so long as the data packet is within multiple network-specific parameters defined for the pass; and
establish said new link as an authenticated link with said connecting computing device based on said credential-holder having possession of or access to valid credentials that includes information authenticating an identity of the credential-holder;
wherein, upon establishing said authenticated link, said connecting computing device and said entry computing device establish a link key for encrypting information transmitted via said authenticated link, and
wherein future demonstration of possession of said link key by said connecting computing device provides said entry computing device with ongoing verification of said authenticated link.

16. The computer program product of claim 15, wherein each of said computing devices previously joined said secure network by establishing an authenticated link within at least one other of said computing devices.

17. The computer program product of claim 15, wherein said computer program instructions additionally cause said one or more computing devices to:
- establish a passbuilder that configures said secure network,
- wherein said passbuilder is configured to issue and revoke said valid credentials.

* * * * *